United States Patent [19]
Torres

[11] Patent Number: 4,821,211
[45] Date of Patent: Apr. 11, 1989

[54] METHOD OF NAVIGATING AMONG PROGRAM MENUS USING A GRAPHICAL MENU TREE

[75] Inventor: Robert J. Torres, Colleyville, Tex.

[73] Assignee: International Business Machines Corp., Armonk, N.Y.

[21] Appl. No.: 122,861

[22] Filed: Nov. 19, 1987

[51] Int. Cl.⁴ .............................................. G09G 1/14
[52] U.S. Cl. .................................... 364/521; 364/300; 340/747
[58] Field of Search ........ 364/300, 521, 522, 518–520; 340/747, 717, 750

[56] References Cited

U.S. PATENT DOCUMENTS

| | | | |
|---|---|---|---|
| 4,556,954 | 12/1985 | Advani et al. | 364/300 X |
| 4,611,306 | 9/1986 | Crehan et al. | 340/747 X |
| 4,665,555 | 5/1987 | Alker et al. | 340/747 X |
| 4,686,522 | 8/1987 | Hernandez et al. | 340/747 X |
| 4,688,181 | 8/1987 | Cottrell et al. | 340/747 X |
| 4,768,144 | 8/1988 | Winter et al. | 364/200 |

Primary Examiner—M. H. Paschall
Assistant Examiner—A. Jonathan Wysocki
Attorney, Agent, or Firm—C. Lamont Whitham; Whitham. Michael E.

[57] ABSTRACT

The menu hierarchy of one or more computer programs on one or more computer systems is visually displayed in a graphical tree structure to facilitate the navigation by a user from one menu in a hierarchical structure of menus to another. Navigation from one menu to another is accomplished by selecting a menu in the graphical menu tree using a pointing device. The navigation may be from one menu to another in the hierarchy of one application program in a computer system or from one menu in the program to a specific menu in the hierarchy of another application program in the computer system or in another computer system. The benefits of the technique are expanded function for intra and inter-window navigation, enhanced learning of the computer system by visual presentation of capabilities and structure, and reduced learning requirements for the user to achieve navigation.

12 Claims, 7 Drawing Sheets

METHOD OF NAVIGATING AMONG PROGRAM MENUS USING A GRAPHICAL MENU TREE

BACKGROUND OF THE INVENTION

1. Field of the Invention

This invention relates generally to navigation techniques within and across computer system programs and, more particularly, to navigation from menus in one computer program to menus in other computer programs.

2. Description of the Prior Art

Presentations of information to users on a computer display device are called menus. Some menus, such as help menus, only provide information, while others include fill-in-the-blanks areas on the display screen to prompt the user to make selections or input information to the system. All computer programs typically have one or more menus. Some of these menus contain selections which lead to other menus within the program.

In the prior art, there are various programs that allow for bypass of one menu to another within the same program. One such program, DisplayWrite ™, a word processing program published by IBM Corp., uses a selection mnemonic technique to bypass menus. Also known are programs which use a menu name mnemonic technique to access, for example, a calendar menu from within another program.

There are also programs which use a "tree-like" representation of hierarchical forms of information, e.g., directory structure. Currently, the only known use of tree-like structures in a graphical representation is for displaying disk storage hierarchies; e.g., a list of directories on a personal computer (PC). These are often referred to as disk operating system (DOS) shells and are characterized by displaying a visual list of the directories of a fixed disk. The user can then select to view the list of files in the directory, rename a directory, or perform other file management functions.

Some systems allow program to program navigation, but only from a menu already displayed in one window to a previously displayed menu in another window. Another allowable alternative in today's art is from a menu in one window to a program selection menu in another window, where a selection leads to displaying the first menu in another program. A specific example of this approach is the MicroSoft Window ™ system in which the main selection menu allows selection of a program name and opening of a window to display the first menu of the selected program.

In single tasking systems, such as the DisplayWrite ™ program, a user can navigate from one menu to another via a series of selections leading the user through a series of menus to the target menu. Where menu bypass functions exist, the user can type in mnemonics to display the target menu directly. However, the user must know the mnemonic of the target.

In multitasking and windowing systems, the user essentially performs navigation along multiple-single paths series of menus concurrently. Target menus must have windows already opened in order to move from a menu in one window to a menu in another window. If the application for the target menu is not open, the user must first open the window, i.e., start the application, and then navigate to the target as in single task systems.

All the current approaches have several problems from the perspective of a user. Users must memorize mnemonics for current bypass techniques within a single application. This places an unnecessary information load on users, who frequently make errors using such techniques. Extra keystrokes are required to navigate to the target menu. Error recovery, reaching the wrong menu due to misspecified mnemonics, and preopening other windows are examples of extra keystrokes required of users. Extra time is taken to learn the mnemonics, input the extra keystrokes, and perform error recovery.

The use of mnemonics to go through various selection options or the use of menu mnemonics to go directly to a menu with a name which has the mnemonic are useful for mostly heavy, intensive use of a software path by a sophisticated user. These techniques do not aid the novice or casual user in performing the function that is desired, i.e., direct movement to another menu in a manner that is easy to learn, remember, and use.

SUMMARY OF THE INVENTION

It is therefore an object of the present invention to provide a technique of menu navigation which is simplified and characterized by being both dynamic and precise.

It is another object of the invention to provide a menu navigation technique in which specific names and other identifying data need not be recalled by an operator.

It is a further object of the present invention to provide a menu navigation system in which calling and window opening are automated under system control based on user definition of the portion of the application hierarchy to be displayed within a window.

According to the invention, there is provided a unique method of, and system for, a visual presentation, in graphical form, of the menu hierarchy of a computer program or programs in a single system or in multiple systems. Navigation from one menu in the hierarchy to another is accomplished by selecting a menu from the graphical menu tree. The navigation may be from one menu in the hierarchy of one application in the computer to a specific menu in the hierarchy of another application in the computer. The benefits of the invention are expanded function for intra and interwindow navigation, improved navigation via reduced keystrokes and errors, enhanced learning of the computer system by visual presentation of capabilities and structure, and reduced learning requirements for the user to achieve navigation. Other usability enhancing features, e.g., customization of the menu flows, automatic opening of windows, automatic starting of applications, etc., result from the use of my invention.

The novelty of the invention lies in the ability to visually display, in graphical form, the menu hierarchy for (a) the program that the user is currently using, (b) other programs on the user's computer, and (c) other programs on other computer systems to which the user has access. Such visual displays typically exist in program specifications and end-user documentation in order to provide an understanding of the structure and options of a computer system or program, but providing an interactive, dynamic display of this type on the computer monitor during the execution of an application program has not been done before. The invention is also characterized by allowing access for all visual displays to perform (a) a bypass of the current menu and access to other menus in the displayed hierarchy, both for the current program and for other programs that may or may not have been started, (b) the auto-start of programs for menus in other programs within the hierarchy when the programs have not been started, (c) the autoopen of windows for selected menus, and specifically a single window for each application selection selected via this technique when such windows have not been opened, (d) the autoinitialization of log-on procedures to automate the access to programs selected that exist on other computer systems by presenting the user with password menus required to identify and verify user access to the selected computer system and program, and (e) the modification of the hierarchy by the end user in order to customize the system or program structure or menu terminology. In this regard, programs can be visually added or deleted, programs can be visually moved to provide different selection order, and menus can be visually added, deleted, or changed for terminology or selection order.

Among the specific advantages of the technique according to the invention are the display to the user of a graphical view of the system structure. This allows the user to understand the program and overall system structure very quickly. The graphical online view of the overall access to other programs to which the user has access unmasks other system capabilities that are inadvertently hidden from users by the designers of a program or system. The user can quickly access other menus in an error-free manner and with a reduced number of keystrokes, especially if mnemonic techniques are also allowed for access of menus within the tree structure. In addition, there is a general reduction in the knowledge required by a user to access and use the bypass techniques, and specifically low memorization requirements are imposed on the user to use the technique according to the invention. This makes bypass accessible by a broader range of end users.

BRIEF DESCRIPTION OF THE DRAWINGS

The foregoing and other objects, aspects and advantages of the invention will be better understood from the following detailed description of the preferred embodiment of my invention with reference to the drawings, in which.

DETAILED DESCRIPTION OF THE PREFERRED EMBODIMENT OF THE INVENTION

The preferred embodiment of the invention contemplates the use of a personal computer, such as the IBM Personal System/2 computers, having a keyboard and an All Points Addressable (APA) graphics display. A mouse or other pointing device is preferred as the selection mechanism. The personal computer may be stand alone or connected to a host computer or local area network. The personal computer is provided with a display management system with a command bar for the selection of actions, a windowing system, and a multitasking operating system. All of the system requirements listed are conventional and well known in the art and will not be described further.

Figure 1:
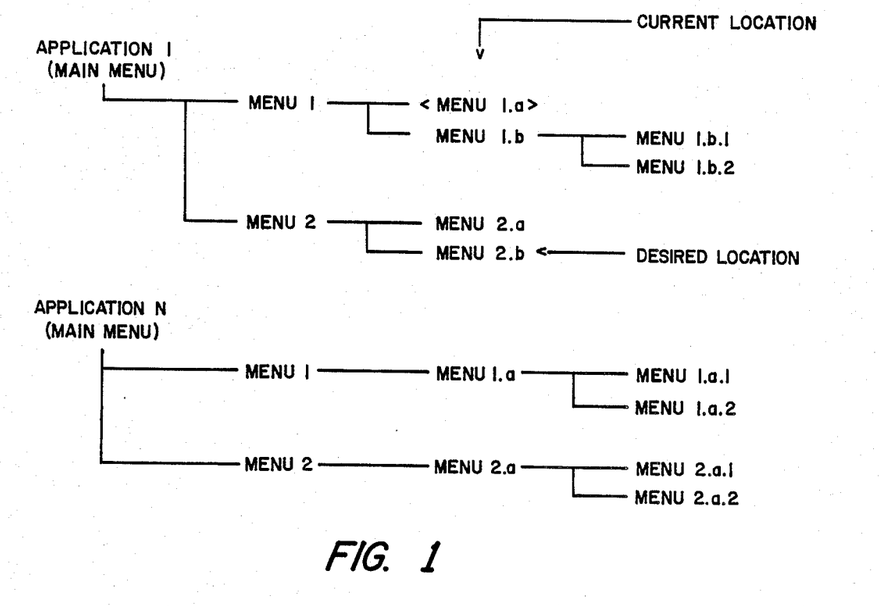
FIG. 1 is an illustration of a graphical menu tree for applications in a computer system with the selection cursor on the current menu of the current application program and the target menu in the same program.

Referring now to the drawings, and more particularly to FIG. 1, there is shown an example of a menu hierarchy for multiple application programs in a computer system. The hierarchy is displayed graphically on a computer system display. The display can be either a character box or an all points addressable (APA), i.e., a bit mapped graphics, display. The control is provided by either keyboard, mouse, touch screen, or voice interaction techniques. It is also to be assumed that a pointer, such as a pointing cursor, is callable and positionable upon the monitor screen relative to the graphic presentation of the menu hierarchy.

The initial position of the pointer is on the graphic position associated with the current menu in the hierarchy from which the graphical menu tree was invoked. With the pointer displayed as shown, it is to be assumed that the operator desires to display another menu in the hierarchy. The operator procedure for accomplishing this task is first to position the pointer to the graphic position associated with the desired menu. FIG. 1 shows the desired menu to be within the same program as the current menu location. The operator then presses the "Enter" key to request performance of the action. The system then displays the desired menu, overlaying the previous menu.

Figure 2:
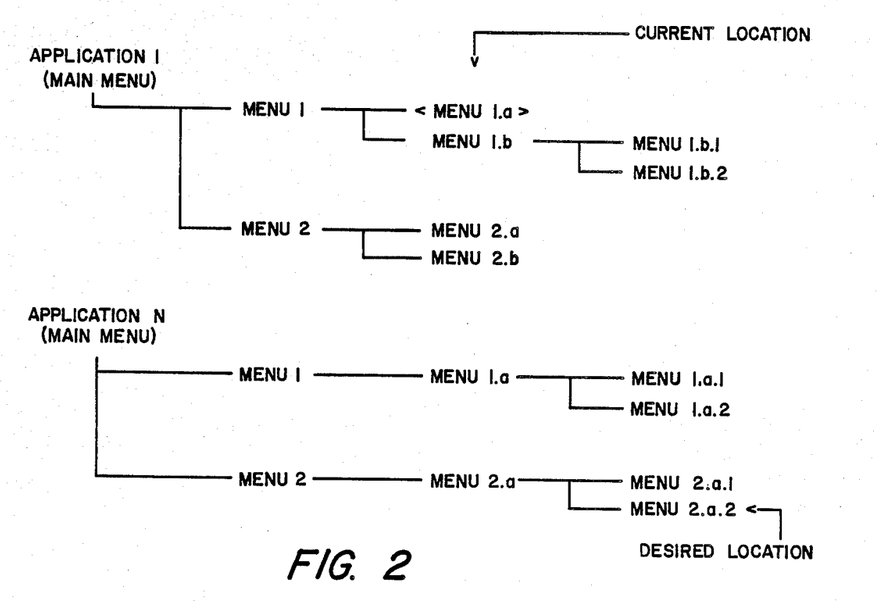
FIG. 2 is an illustration of the same graphical menu tree shown in FIG. 1 with the selection cursor on the current menu of the current application and the target menu in another application program within the computer system.

FIG. 2 shows the same graphical menu tree as in FIG. 1. The key difference from FIG. 1 is that the desired menu that the user wants to display is in another program. As in FIG. 1, the user positions the pointer on the graphic position associated with the desired menu. The user requests performance of the action via the "Enter" key, and the desired menu is displayed.

If the system is single tasking in nature, the new menu overlays the previous menu on the system display. If the system is multi-tasking in nature, the previous menu is displayed in a window. The new menu is displayed in a new window which is automatically opened. The previous menu in its window is left displayed.

Figure 3:
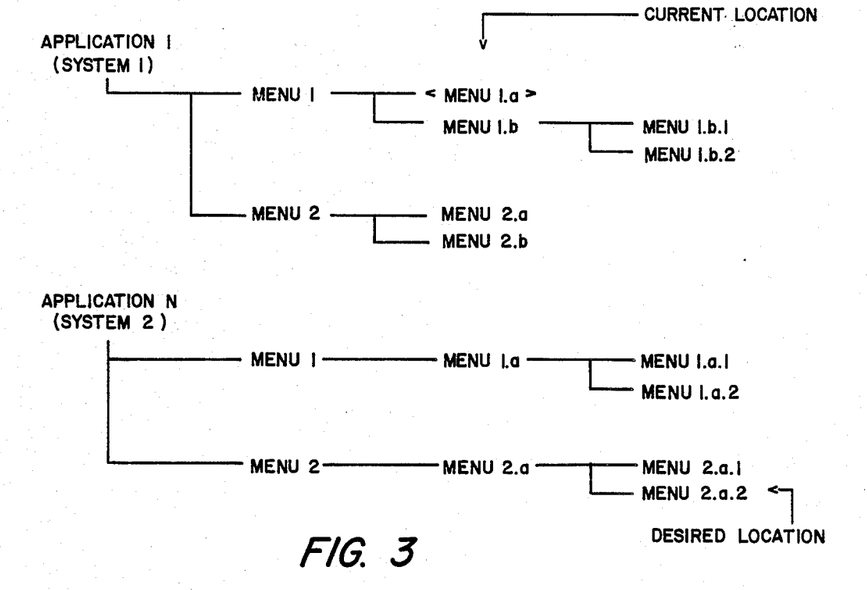
FIG. 3 is an illustration of a graphical menu tree for multiple applications in multiple computer systems with the selection cursor on the current menu of the current application in system 1 and the target menu in another application on another computer system.

FIG. 3 illustrates a graphical menu tree for all programs that a user can access in a multicomputer system environment. The current menu is on one computer system. The desired menu is on a different computer system. The user positions the pointer to the desired menu and presses "Enter". The computer system connections are established to allow the user to access and operate the program on the other system. If multi-windowing is allowed, the desired menu is displayed in its own window; otherwise, the menu overlays the previous menu.

An important feature of the invention is menu customization allowable to the user. Using the graphical menu tree, it is possible for the user to perform the following actions in a graphical manner:

(1) Moving menus from one location in the hierarchy to another.

(2) Deleting menus from the hierarchy.

(3) Adding connections for user defined menus to be placed in the hierarchy.

(4) Performing the "undo" action to repair potential errors.

Reference is next made to the flow chart of FIGS. 4A to 4D. The flow chart illustrates system operations for causing navigation using the graphical menu tree or for causing its alteration. It is assumed that an application is active and that a menu of the application is currently displayed. The menu typically has a command bar at the top of the display screen with several actions which may be selected using a mouse or other pointing device. One of the actions which may be selected is the "MENUTREE" function of the present invention. For purposes this description, that is the function or action which is of interest.

Figure 4A:
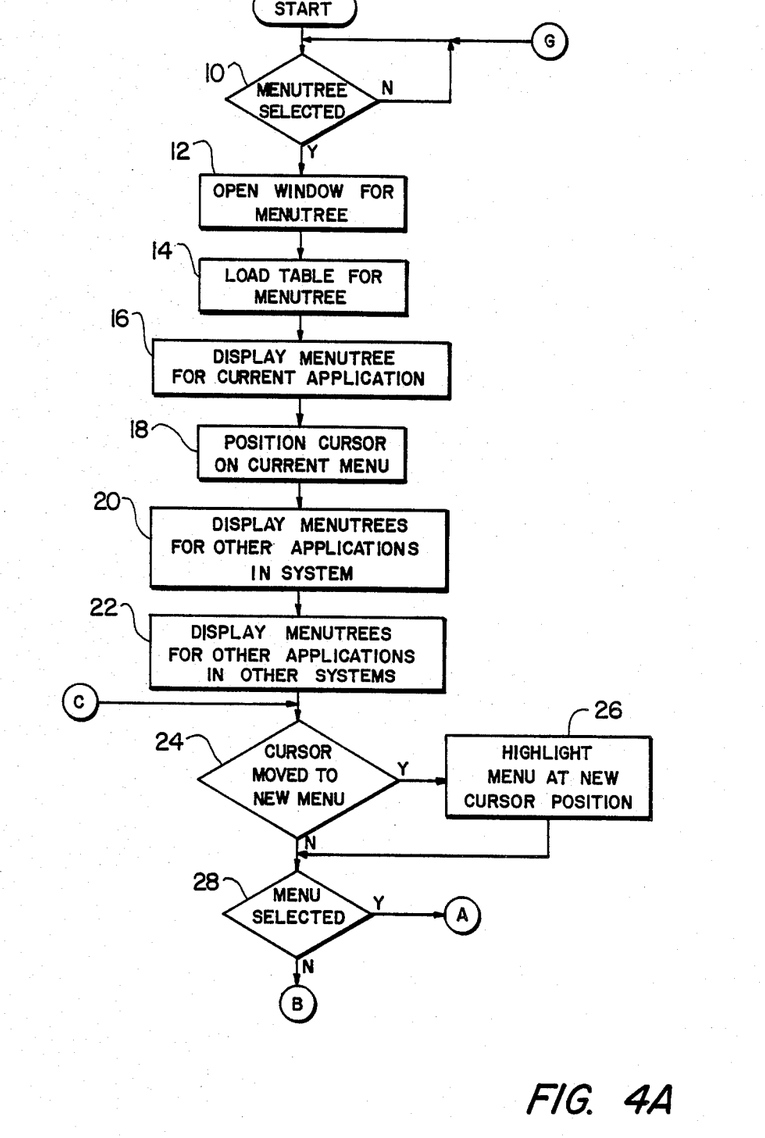
FIGS. 4A to 4D, taken together, are a flow chart of the system functions required to navigate from one menu to another according to this invention.

The system monitors the user input in decision block 10 to determine if the "MENUTREE" function has been selected. When it is, the first operation in function block 12 is to open a window for the menu tree display. Then, in function block 14, a table is loaded with data which identifies the invoking application and menu, other applications supporting the menu tree function, the list of menus for each such application, names of each menu displayed on the tree, the load status of each application, and the system location of the application and its menus. In order to support the menu tree function, applications must have entries in the menu tree table. The load status in the table determines whether the application is currently active. If the application is not active, the menu tree will auto-start. If the application is active, the menu tree will activate the window for the application.

Once the table has been loaded, the menu tree for the current application is displayed in function block 16. The cursor is positioned over the menu on the menu tree representation for the menu from which the menu tree function was invoked in function block 18. This is done by highlighting that menu in the menu tree representation. In this way, the user has an immediate feed back showing where he or she is in the hierarchy of menus in the current application.

After the menu tree for the current application is displayed, the menu trees for the other applications on the system are displayed in function block 20. This is followed by displaying, in function block 22, the menu trees for other applications on other systems to which the user has access and which support the menu tree function. It will of course be understood that the menu trees for all applications may not be visible simultaneously on the display screen and it may be necessary to scroll the display up and down and, depending on the number of menus in and the depth of a given hierarchy, left and right. Scrolling is done in a conventional manner and no more need be said on the subject. It should be noted that the menu trees for all applications are displayed in a predefined order. The order is determined by the order of appearance of the applications in the system selection menu from which the applications are invoked when the menu tree is not used.

The system next monitors the user input to determine if the cursor has been moved to another menu in decision block 24. This new menu may be in the same application (FIG. 1), in a different application on the same system (FIG. 2), or in a different application in a different system (FIG. 3). If the cursor has been moved to a new menu in the display, the menu is highlighted at the new cursor location in function block 26 to provide the user with a visual feed back to show his or her current location within the menu display. A given menu corresponding to the current cursor location can be selected by pressing the "Enter" key on the keyboard or pressing the select button on the mouse. If a menu is selected, as determined in decision block 28, control goes to connector A at the top of FIG. 4C; otherwise, control goes to connector B at the top of FIG. 4B.

Figure 4B:
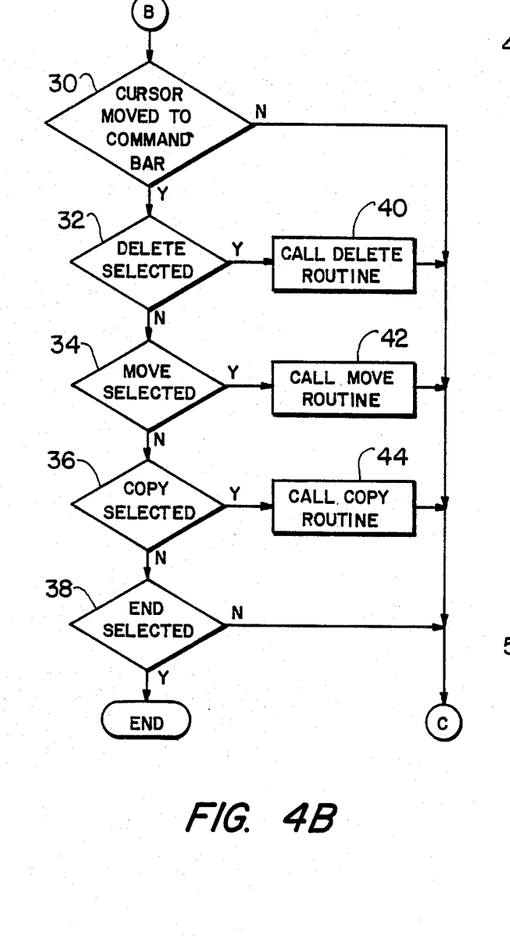

Assuming for now that the user does not select a menu and with reference to FIG. 4B, the system monitors user input to determine if the cursor has been moved to the command bar, as indicated by decision block 30. If not, control loops back to decision block 24; but if so, the system monitors user input to determine whether DELETE, MOVE, COPY, or END actions in the command bar are selected, as indicated by decision blocks 32, 34, 36, and 38. If for example the DELETE action is selected, a delete routine is called in function block 40. If the MOVE action is selected, a move routine is called in function block 42. If the COPY action is selected, a copy routine is called in function block 44. At the end of each of these routines, control loops back to decision block 24 in FIG. 4A. If on the other hand, the END action is selected, the menu tree function is terminated and the menu from which the function was invoked is redisplayed.

As previously mentioned, the invention allows the user to "customize" application menus, and this is accomplished by the ability to select the DELETE, MOVE and COPY actions from the command bar, as illustrated in FIG. 4B. Thus, if the user selects the DELETE action, the user will be prompted to select a menu from one of the menu trees to be deleted. Before the selected menu is deleted, the user will be asked to confirm that the selected menu is to be deleted. If the user selects the MOVE action, the user will be prompted to select a menu from one of the menu trees to be moved, and when a menu is selected, the user will be prompted to indicate where in a menu tree the selected menu to be moved. If the user selects the COPY action, the user will be prompted to select a menu from one of the menu trees to be copied, and when a menu is selected, the user will be prompted to indicate where in a menu tree the selected menu is to be duplicated. In each case, selection and pointing is by means of a mouse or other pointing device. Furthermore, the DELETE, MOVE and COPY routines in function blocks 40, 22 and 44 are conventional in editors except for their application to menu trees according to the invention and, therefore, the details of those routines need not be described in more detail.

Figure 4C:
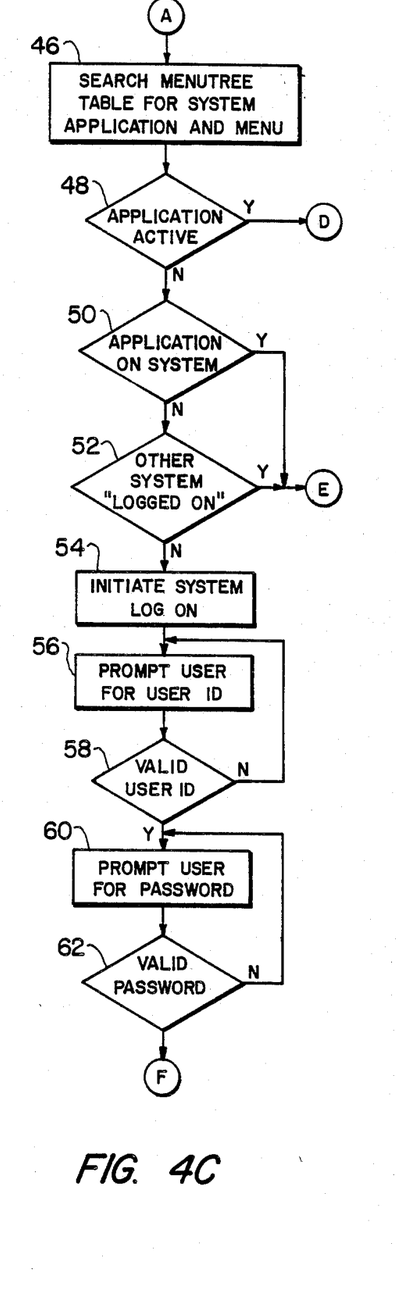

Returning to decision block 28 in FIG. 4A, if a menu is selected from a displayed menu tree, control goes to connector A at the top of FIG. 4C. This causes the system to search the table constructed in function block 14 of FIG. 4A for the system, application and the selected menu, as indicated in function block 46. Once the selected menu is located in the table, the table is checked in decision block 48 to determine if the application is active. Assuming for now that the application is not currently active, the system next checks the table in decision block 50 to determine if the application is on the system. If not, the system checks the table again in decision block 52 to determine if the other system on which the application resides is "logged on"; that is, has the user logged on to the other system according to the system protocol. The other system may be a host connected via a gateway or another system on a local area network.

Assuming that the other system is not "logged on", the log on procedure is initiated in function block 54. The details of the log on procedure do not form part of the present invention and vary from system to system. However, for purposes of illustration, the log on procedure typically prompts the user in function block 56 to enter his or her user identification (ID). The system checks the entered user ID in decision block 58 to determine if it is valid. If not, the user is again prompted to enter his or her user ID in function block 56; but if so, the user is next prompted to enter the password in function block 60. The system then checks the entered password in decision block 62 to determine if it is valid. If not, the user is again prompted to enter the password in function block 60; but if so, control goes to connector F at the top of FIG. 4D. It will, of course, be understood that the log on procedure illustrated is a simplified representation and may or may not include both user ID and password protection. The specific procedure will depend on the specific host or local area network protocol.

Figure 4D:
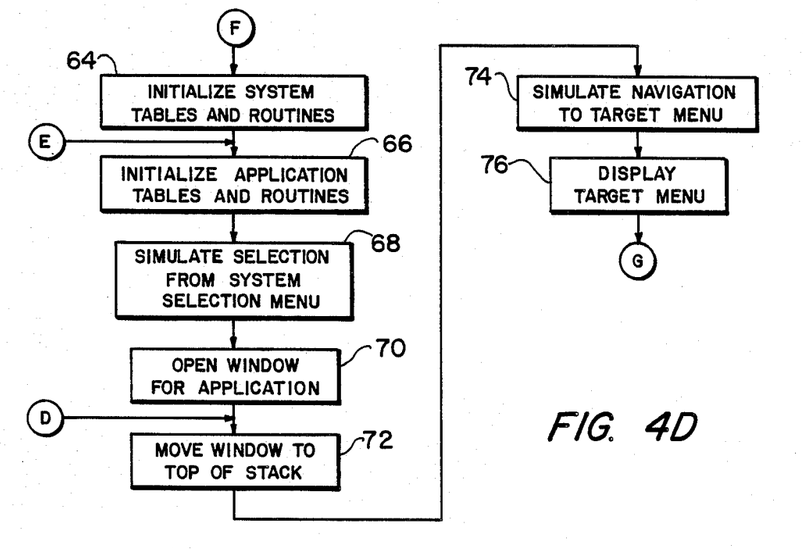

Turning now to FIG. 4D, once the other system has been logged on, the system tables and routines are initialized in function block 64. If the other system was already logged on or if the application was in the system as determined in the tests of decision blocks 52 or 50, respectively, in FIG. 4C, then control would have passed directly to function block 66 where the application tables and routines are initialized. Then, in function block 68, the selection is simulated from the system selection menu; that is, the system takes its que from the menu selected by the user and sets whatever flags and loads the necessary registers to select and activate the program, all without the intervention of the user, thereby simulating keyboard input by the user. A window is next opened for the application in function block 70.

If the application had been active as determined in the test of decision block 48 in FIG. 4C, control would have passed directly to function block 72 where the window for the application is moved to the top of the stack. Then, in function block 74, the navigation to the target menu is simulated and, finally, the target menu is displayed in function block 76. Again, what is meant by simulation is that the system generates the required controls to move to that part of the program where the selected menu is located, without any keyboard input by the user. Control then passes via connector G to decision block 10 at the top of FIG. 4A.

Set out below is an illustration of a routine or application usable by a processor in the navigation or alteration of the graphical menu tree based upon operator input and actions. The routine is in program design language (PDL) from which source and machine code are derivable by a programmer of ordinary skill in the art.

```
DISPLAY THE MENU TREE
   OPEN A WINDOW
   PLACE WINDOW ON TOP OF WINDOW STACK
   DISPLAY THE TREE FOR CURRENT PRORAM
   DISPLAY THE TREE FOR OTHER PROGRAMS IN SAME SYSTEM
   DISPLAY THE TREE FOR OTHER PROGRAMS IN OTHER SYSTEMS
   HIGHLIGHT CURRENT LOCATION IN TREE
ON POINTER SELECTION
   CALL OBJECT
   CASE OF OBJECT-TYPE
      CASE: DISPLAY MENU, SAME PROGRAM
         CALL FIND-ATTACH
         WHILE "NEW MENU" IS SELECTED
           RETURN
           CALL FIND MENU
           ERASE OLD MENU
           DISPLAY NEW MENU
           PLACE PROGRAM WINDOW ON TOP OF WINDOW STACK
         ENDWHILE
      CASE: DISPLAY MENU, ANOTHER PROGRAM, SAME SYSTEM
         CALL FIND-ATTACH
         WHILE "NEW MENU" IS SELECTED
           CALL FIND MENU
           CASE: PROGRAM NOT ACTIVE
              OPEN NEW WINDOW FOR NEW MENU
              PLACE NEW WINDOW ON TOP OF WINDOW STACK
              DISPLAY NEW MENU IN NEW WINDOW
           CASE: PROGRAM ACTIVE
              BRING EXISTING WINDOW TO TOP OF WINDOW STACK
              OVERLAY OLD MENU IN OLD WNDOW
              DISPLAY NEW MENU IN EXISTING WINDOW
      ENDWHILE
         CASE: DISPLAY HELP MENU
            CALL FIND-ATTACH
            WHILE "HELP MENU" IS SELECTED
              CALL FIND MENU
              OPEN NEW WINDOW FOR HELP MEU
              DISPLAY HELP MENU
              PLACE HELP WINDOW ON TOP OF WINDOW STACK
         ENDWHILE
            CASE: DISPLAY MENU, ANOTHER PROGRAM, ANOTHER COMPUTER SYSTEM
               CALL FIND-ATTACH
               WHILE "NEW MENU" IS SELECTED
                 CALL FIND MENU
                 CASE: OTHER SYSTEM NOT CONNECTED
                    OPEN CONNECTIONS TO OTHER SYSTEM
                    OPEN NEW WINDOW FOR NEW MENU
                    PLACE NEW WINDOW ON TOP OF WINDOW STACK
                    PROMPT USER FOR ID/PASSWORD
                    INITIALIZE OTHER SYSTEM
```

```
        -continued
        OVERLAY OLD INFORMATION IN WINDOW
        DISPLAY NEW MENU
     CASE: OTHER SYSTEM CONNECTED
       CASE: PROGRAM NOT ACTIVE
         OPEN NEW WINDOW FOR NEW MENU
         PLACE NEW WINDOW ON TOP OF WINDOW STACK
         DISPLAY NEW MENU IN NEW WINDOW
       CASE: PROGRAM ACTIVE
         BRING EXISTING WINDOW TO TOP OF WINDOW STACK
         OVERLAY OLD MENU IN OLD WINDOW
         DISPLAY NEW MENU IN EXISTING WINDOW
     ENDWHILE
  CASE: PERFORM OTHER TYPES OF OPERATION ON SELECTED MENU
     CALL FIND-ATTACH
     WHILE "NEW MENU" IS SELECTED
       CALL FIND MENU
     OPEN CONNECTIONS TO OTHER SSTEM IF
APPROPRIATE
     PERFORM SELECTED OPERATION ON MENU (E.G., DELETE)
       RETURN TO OLD MENU
     ENDWHILE
ENDCASE
```

In summary, a unique method of, and system for, navigation across different menus, in different programs, and different systems is provided. Also, a unique method of editing the configuration of the menu tree is provided. The results for the operator are a reduced number of worksteps for navigation (or bypass) across menus on different programs or systems, an improved learning curve by making users visually aware of programs available for use, an improved throughput and productivity, and expanded capabilities.

While the invention has been particularly shown and described with reference to a preferred embodiment, it will be understood by those skilled in the art that various changes in form and detail may be made without departing from the spirit and scope of the invention as defined in the appended claims.

Having thus described my invention, what I claim as novel and desire to secure by Letters Patent is the following:

1. A method for the interactive visual presentation in graphical form of the menu hierarchy of one or more computer programs on one or more computer systems and navigation from one menu in the hierarchy to another comprising the steps of:
   while displaying a menu in a currently active computer program, monitoring a user input requesting the display of a menu hierarchy, and in response to said input, displaying the menu hierarchy of said currently active computer program in a graphical tree structure;
   highlighting in the graphical tree structure the menu displayed at the time the user requested the display of the menu hierarchy; and
   monitoring the position of a pointing device on said graphical tree structure and, in response to a selection by a user input, performing an operation on a menu in said hierarchy at the position of said pointing device.

2. The method recited in claim 1 wherein said one computer system is a multitasking system in which more than one computer program can be active at any given time, said step of displaying further including displaying the menu hierarchies in graphical tree structures of all computer programs installed on said one computer system.

3. The method recited in claim 2 further comprising the steps of:
   in response to a user input requesting the display of a menu hierarchy, opening a window for the display of said graphical tree structures; and
   in response to a user input selecting a menu in a computer program other than said currently active program, opening a window and activating the program in which said menu is selected if said program is not already active.

4. The method recited in claim 1 wherein said one computer system is connected to at least one other computer system, said step of displaying further including displaying the menu hierarchies in graphical tree structures of all computer programs installed on said other computer system.

5. The method recited in claim 4 further comprising the steps of:
   in response to a user input selecting a menu in a graphical tree structure of a computer program installed on said other computer system, initiating a log on procedure to said other computer system if the computer system is not already logged on; and
   activating the computer program in which the menu is selected after the log on procedure is completed.

6. The method recited in claim 1 wherein said one computer system is a multitasking system in which more then one computer program can be active at any given time and said one computer system is connected to at least one other computer system, the step of displaying further including displaying the menu hierarchies in graphical tree structures of all computer programs installed on said one computer system and installed on said other computer system.

7. The method recited in claim 6 further comprising the steps of:
   in response to a user input requesting the display of a menu hierarchy, opening a window for the display of said graphical tree structures;
   in response to a user input selecting a menu in a computer program other than said currently active program, checking to determine if said computer program is installed on said one computer system;
   if said computer program is installed on another computer system, initiating a log on procedure to said other computer system if the computer system is not already logged on; and
   activating the computer program in which the menu is selected if installed on said one computer system or after the log on procedure is completed if installed on said other computer system.

8. The method recited in claim 1 wherein the step of performing an operation on a menu in said hierarchy comprises the step of displaying said menu.

9. The method recited in claim 1 wherein the step of performing an operation on a menu in said hierarchy comprises the step of deleting the selected menu from the menu hierarchy.

10. The method recited in claim 1 wherein the step of performing an operation on a menu in said hierarchy comprises the step of moving the selected menu from one position in the menu hierarchy to another position in the menu hierarchy.

11. The method recited in claim 1 wherein the step of performing an operation on a menu in said hierarchy comprises the step of copying the selected menu at another position in the menu hierarchy.

12. The method recited in claim 1 wherein the step of performing an operation on a menu in said hierarchy comprises one of the steps of displaying the menu, deleting the menu from the hierarchy, moving the menu from one position in the menu hierarchy to another position in the menu hierarchy, or copying the selected menu to another position in the menu hierarchy, depending on a selection made by the user.

* * * * *